United States Patent
Serebrin

(10) Patent No.: US 9,626,300 B2
(45) Date of Patent: Apr. 18, 2017

(54) ADDRESS CACHING IN SWITCHES

(71) Applicant: Google Inc., Mountain View, CA (US)

(72) Inventor: Benjamin C. Serebrin, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 2 days.

(21) Appl. No.: 14/810,062

(22) Filed: Jul. 27, 2015

(65) Prior Publication Data

US 2017/0031835 A1    Feb. 2, 2017

(51) Int. Cl.
*G06F 12/10* (2016.01)
*G06F 12/1045* (2016.01)
(Continued)

(52) U.S. Cl.
CPC .......... *G06F 12/1045* (2013.01); *G06F 3/067* (2013.01); *G06F 3/0611* (2013.01); *G06F 3/0656* (2013.01); *G06F 12/0882* (2013.01); *G06F 2212/1024* (2013.01); *G06F 2212/152* (2013.01); *G06F 2212/154* (2013.01); *G06F 2212/264* (2013.01); *G06F 2212/604* (2013.01); *G06F 2212/608* (2013.01); *G06F 2212/68* (2013.01)

(58) Field of Classification Search
CPC ............. G06F 12/1045; G06F 12/0882; G06F 3/0611; G06F 3/067; G06F 3/0656; G06F 2212/68; G06F 2212/608; G06F 2212/1024; G06F 2212/604; G06F 2212/154; G06F 2212/152; G06F 2212/264
See application file for complete search history.

(56) References Cited

U.S. PATENT DOCUMENTS

| 7,779,197 B1 | 8/2010 | Norrie et al. |
| 2007/0130441 A1 | 6/2007 | Wooten |

(Continued)

FOREIGN PATENT DOCUMENTS

EP    2521320    11/2012

OTHER PUBLICATIONS

International Search Report and Written Opinion in International Application No. PCT/US2016/03933, mailed Aug. 26, 2016, 12 pages.

(Continued)

*Primary Examiner* — John A Lane
(74) *Attorney, Agent, or Firm* — Fish & Richardson P.C.

(57) ABSTRACT

Methods, systems, and apparatus, including computer programs encoded on computer storage media, for storing an address in a memory of a switch. One of the systems includes a switch that receives packets from and delivers packets to devices connected to a bus without any components on the bus between the switch and each of the devices, a memory integrated into the switch to store a mapping of virtual addresses to physical addresses, and a storage medium integrated into the switch storing instructions executable by the switch to cause the switch to perform operations including receiving a response to an address translation request for a device connected to the switch by the bus, the response including a mapping of a virtual address to a physical address, and storing, in the memory, the mapping of the virtual address to the physical address in response to receiving the response.

24 Claims, 3 Drawing Sheets

(51) Int. Cl.
*G06F 12/0882* (2016.01)
*G06F 3/06* (2006.01)

(56) References Cited

U.S. PATENT DOCUMENTS

| | | | |
|---|---|---|---|
| 2008/0120487 A1* | 5/2008 | Saripalli | G06F 12/1081 711/206 |
| 2009/0327645 A1 | 12/2009 | Doi | |
| 2012/0210169 A1* | 8/2012 | Coile | G06F 11/2092 714/22 |
| 2013/0080726 A1 | 3/2013 | Kegel et al. | |
| 2014/0348162 A1* | 11/2014 | Banavalikar | H04L 45/72 370/389 |

OTHER PUBLICATIONS

Anurup et al., "IOMMU: A Detailed view," Huawei Technologies Co., Ltd., Nov. 2014 [retrieved on Dec. 1, 2014]. Retrieved from the Internet: URL<http://osidays.com/osidays/wp-content/uploads/2014/12/Final__OSI2014__IOMMU__DetailedView__Sanil__Anurup.pdf>, 18 pages.

Ben-Yahuda et al., "Using IOMMUs for Virtualization in Linux and Xen," Mulix.com Lecture [retrieved on May 20, 2015]. Retrieved from the Internet: URL<http://www.mulix.org/lectures/using-iommuns-for-virtualization/OLS-jdmason.pdf>, 18 pages.

Rodel, "AMD IOMMU Version 2: How KVM will use it," Aug. 16, 2011 [retrieved on May 20, 2015]. Retrieved from the Internet: URL<http://www.linux-kvm.org/wiki/images/b/b1/2011-forum-and-iommuv2-kvm.pdf>, 14 pages.

Stanislawski, "Page migration for IOMMU enhanced devices," Linux Foundation, Aug. 20, 2013 [retrieved on May 20, 2015]. Retrieved from the Internet: URL<http://events.linuxfoundation.org/sites/events/files/slides/main.pdf>, 36 pages.

Wikipedia, "IOMMU," Apr. 5, 2015 [retrieved on May 5, 2015]. Retrieved from the Internet: URL<http://en.wikipedia.org/wiki/IOMMU>, 4 pages.

* cited by examiner

ADDRESS CACHING IN SWITCHES

BACKGROUND

This specification relates to switches, for example, switch chips.

Input/output memory management units (IOMMUs) walk page tables to translate device addresses, for translation requests and for protection in systems that run virtual machines. In some examples, IOMMUs may do partial page walk caching, e.g., a) to conserve space when limited memory is available, b) when the IOMMU responds to translation requests for a large number of devices, or both.

Peripheral Component Interconnect Express (PCIe) address translation services (ATS) allows a device to request an address translation from an IOMMU and cache the translation locally on the device, e.g., in a translation lookaside buffer (TLB). In some instances, a device's TLB might not be large enough to store all virtual address to physical address mappings the device will use.

SUMMARY

A switch chip used for a bus, e.g., a PCI or Peripheral Component Interconnect Express (PCIe) bus, receives translated addresses and uses the translated addresses to verify that memory access requests from devices connected to the bus managed, at least in part, by the switch chip are valid. For instance, the switch chip may store a page table in a cache or a mapping of virtual addresses to physical addresses in a translation lookaside buffer (TLB) and use addresses from the page table or the TLB to respond to translation requests from devices connected to the bus managed, at least in part, by the switch chip, validate access requests from those devices, or both. For brevity, the specification may refer to devices "connected to the switch chip," which is understood to mean connected to a bus or point-to-point connection for which memory requests and address translation requests are controlled or managed, at least in part, by the switch chip.

The switch chip may include an input/output memory management unit (IOMMU) that stores a page table, or part of a page table, for each device. When the switch chip receives a translation request from a device, the switch chip may provide the translation request to the integrated IOMMU, receive a physical address from the integrated IOMMU in response, and provide the physical address to the device.

When the switch chip receives memory access requests that include physical addresses from a device, the switch chip uses the page table for the device, stored in the integrated IOMMU, to verify that the page table includes the physical address and, if so, the device is allowed to access the corresponding memory location. If the page table does not include the physical address, the switch chip prevents the device from accessing the memory location.

In some examples, the switch chip includes a TLB, e.g., a cache, in which the switch chip stores a table, e.g., per device, that maps virtual addresses to physical addresses. The switch chip may associate a particular table with a device using a port number at which the device communicates with the switch chip.

When the switch chip receives an address translation request with a particular virtual address from a device, the switch chip determines if the TLB includes a mapping for the particular virtual address and, if so, provides the corresponding physical address to the device. If not, the switch chip forwards the address translation request to another device, e.g., a root complex, and receives a response from the other device. The switch chip forwards the response to the requesting device and caches the response in the TLB. When the switch chip includes per device TLBs, the switch may look only in that particular device's TLB for the mapping and, if the mapping is not stored in that TLB, store the mapping received from the other device in the TLB for the device.

When the switch chip receives an access request from a device, the switch chip uses the TLB for the device to verify that the device has access to a memory location identified by a physical address included in the access request, e.g., that the physical address is included in the device's TLB. If physical address is in the device's TLB, the switch chip allows the device access to the memory location. If the physical address is not in the device's TLB, the switch chip prevents the device from accessing the memory location, e.g., and does not forward the request to another device.

In general, one innovative aspect of the subject matter described in this specification can be embodied in systems that include a switch that receives packets from and delivers packets to one or more devices connected to a bus without any components on the bus between the switch and each of the devices, a memory integrated into the switch to store a mapping of virtual addresses to physical addresses, and a non-transitory computer readable storage medium integrated into the switch storing instructions executable by the switch and upon such execution cause the switch to perform operations including receiving, by the switch, a response to an address translation request for a device connected to the switch by the bus, the response including a mapping of a virtual address to a physical address, and storing, in the memory, the mapping of the virtual address to the physical address in response to receiving the response to the address translation request for the device. Other embodiments of this aspect include corresponding computer systems, apparatus, methods, and computer programs recorded on one or more computer storage devices, each configured to perform the actions of the operations. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in systems that include a switch that routes packets across a bus, a memory integrated into the switch to store a mapping of virtual addresses to physical addresses, and a non-transitory computer readable storage medium integrated into the switch storing instructions executable by the switch and upon such execution cause the switch to perform operations including receiving, by the switch, a response to an address translation request for a device, the response including a mapping of a virtual address to a physical address, storing, in the memory, the mapping of the virtual address to the physical address in response to receiving the response to the address translation request for the device, receiving, from the device, a memory access request that includes a particular physical address, determining that the particular physical address is stored in the memory, and forwarding the memory access request to another device for servicing in response to determining that the particular physical address is stored in the memory. Other embodiments of this aspect include corresponding computer systems, apparatus, methods, and computer programs recorded on one or more computer storage devices, each configured to perform the actions of the operations. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in systems that include a switch that routes packets across a bus, a memory integrated into the switch to store a mapping of virtual addresses to physical addresses, and a non-transitory computer readable storage medium integrated into the switch storing instructions executable by the switch and upon such execution cause the switch to perform operations including receiving, by the switch, a response to an address translation request for a device, the response including a mapping of a virtual address to a physical address, storing, in the memory, the mapping of the virtual address to the physical address in response to receiving the response to the address translation request for the device, receiving, from the device, a memory access request that includes a particular physical address, determining that the particular physical address is not stored in the memory, and discarding the memory access request in response to determining that the particular physical address is not stored in the memory. Other embodiments of this aspect include corresponding computer systems, apparatus, methods, and computer programs recorded on one or more computer storage devices, each configured to perform the actions of the operations. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The system may include an input/output memory management unit (IOMMU) integrated into the switch, the IOMMU including an IOMMU memory. The memory may include the IOMMU memory. Receiving, by the switch, the response to the address translation request for the device may include receiving, by the switch, a portion of a page table for the device. Storing, in the memory, the mapping of the virtual address to the physical address may include storing the portion of the page table in the IOMMU.

In some implementations, the memory may include a translation lookaside buffer (TLB). Storing, in the memory, the mapping of the virtual address to the physical address may include storing, in the TLB, the mapping of the virtual address to the physical address. The system may include a predetermined number of ports for the switch, each of the ports corresponding to a particular device and for which the switch includes a single TLB. The operations may include determining that the TLB does not include an empty location in response to receiving the response to the address translation request for the device, removing an entry from a location in the TLB, and storing a new entry in the location in the TLB that maps the virtual address to the physical address. The operations may include determining that the device includes a TLB and a setting for the device indicates that the device is currently storing virtual address to physical address mappings in the device's TLB, sending a message to the device instructing the device to remove an entry from the device's TLB in response to determining that the device includes a TLB and the setting for the device indicates that the device is currently storing virtual address to physical address mappings in the device's TLB, and providing the mapping of the virtual address to the physical address to the device in response to determining that the device includes a TLB and the setting for the device indicates that the device is currently storing virtual address to physical address mappings in the device's TLB. The operations may include receiving, from the device, a confirmation that the device has removed the entry from the device's TLB, wherein providing the mapping of the virtual address to the physical address to the device comprises providing the mapping of the virtual address to the physical address to the device in response to receiving the confirmation that the device has removed the entry from the device's TLB.

In some implementations, the operations may include receiving, from the device, a memory access request that includes a particular physical address, determining that the particular physical address is stored in the memory, and forwarding the memory access request to another device for servicing in response to determining that the particular physical address is stored in the memory. The memory may be specific to the device and might not include any virtual address to physical address mappings for other devices connected to the switch by the bus. The system may include one or more additional memories integrated into the switch, each of the additional memories and the memory specific to a particular device connected to the switch by the bus. Determining that the particular physical address is stored in the memory may include determining that a particular port in the switch received the memory access request, selecting the memory for the device using the particular port, and determining that the particular physical address is stored in the memory in response to selecting the memory for the device using the particular port. The system may include a central processing unit, and a cache. Receiving the response to the address translation request for the device may include receiving the mapping of the virtual address to the physical address from the cache. Forwarding the memory access request to another device for servicing may include forwarding the memory access request to the central processing unit. The system may include a controller on a second bus that connects the switch to the central processing unit and the cache, via the second bus, and routes responses and requests to and from the switch and the central processing unit and the cache using the second bus. The controller may include a root complex. The system may include a plurality of switches including the switch, and a controller on a second bus that connects each of the plurality of switches to the central processing unit and the cache, via the second bus, and routes responses and requests to and from each of the plurality of switches and the central processing unit and the cache using the second bus.

In some implementations, the system includes a motherboard, and the bus, integrated into the motherboard, for which the switch is configured to route requests from a source device to a destination device to allow peripheral devices to connect to the motherboard. The operations may include receiving, from the device, a memory access request that includes a particular physical address, determining that the device is not allowed to access a memory location identified by the particular physical address, and discarding the memory access request in response to determining that the device is not allowed to access a memory location identified by the particular physical address. The operations may include resetting the device in response to determining that the particular physical address is not stored in the memory.

In some implementations, the operations may include receiving, by the switch from the device, the address translation request that includes the virtual address, determining that the virtual address is not stored in the memory, and requesting the mapping of the virtual address to the physical address, wherein receiving, by the switch, the response to the address translation request for the device comprises receiving the response in response to requesting the mapping of the virtual address to the physical address. The operations may include determining a corresponding physical address for the virtual address using the mapping of the virtual address to the physical address, and providing, to the device, a response to the translation request that includes the corresponding physical address. The operations may include determining whether the memory includes the mapping of the virtual address to the physical address concurrently with requesting the mapping of the virtual address to the physical address. Requesting the mapping of the virtual address to the physical address may include requesting, from a central processing unit, the mapping of the virtual address to the physical address. Requesting the mapping of the virtual address to the physical address may include requesting, from a memory, the mapping of the virtual address to the physical address. Requesting the mapping of the virtual address to the physical address may include requesting, from an input/output memory management unit (IOMMU), the mapping of the virtual address to the physical address.

In some implementations, the system may include a predetermined number of ports integrated into the switch, each of the ports corresponding to a particular device for which the memory is configured to store a corresponding mapping of virtual addresses to physical addresses, wherein a size of the memory corresponds to the predetermined number of ports. The switch may be a switch chip.

The subject matter described in this specification can be implemented in particular embodiments and may result in one or more of the following advantages. In some implementations, a system that includes a switch chip with a memory that stores virtual address to physical address mappings allows the system to scale out as additional switch chips are added. For instance, the switch chip allows the system to include more devices connected to a bus managed, at least in part, by the switch chip, more devices connected to other buses managed, at least in part, by other switch chips, or both. In some implementations, the systems and methods described below allow a system to more quickly respond to address translation requests than systems that do not include a switch chip with a memory for virtual address to physical address mappings. In some implementations, the systems and methods described below allow a system to verify that a device has access to a particular physical address included in a memory access request from the device.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
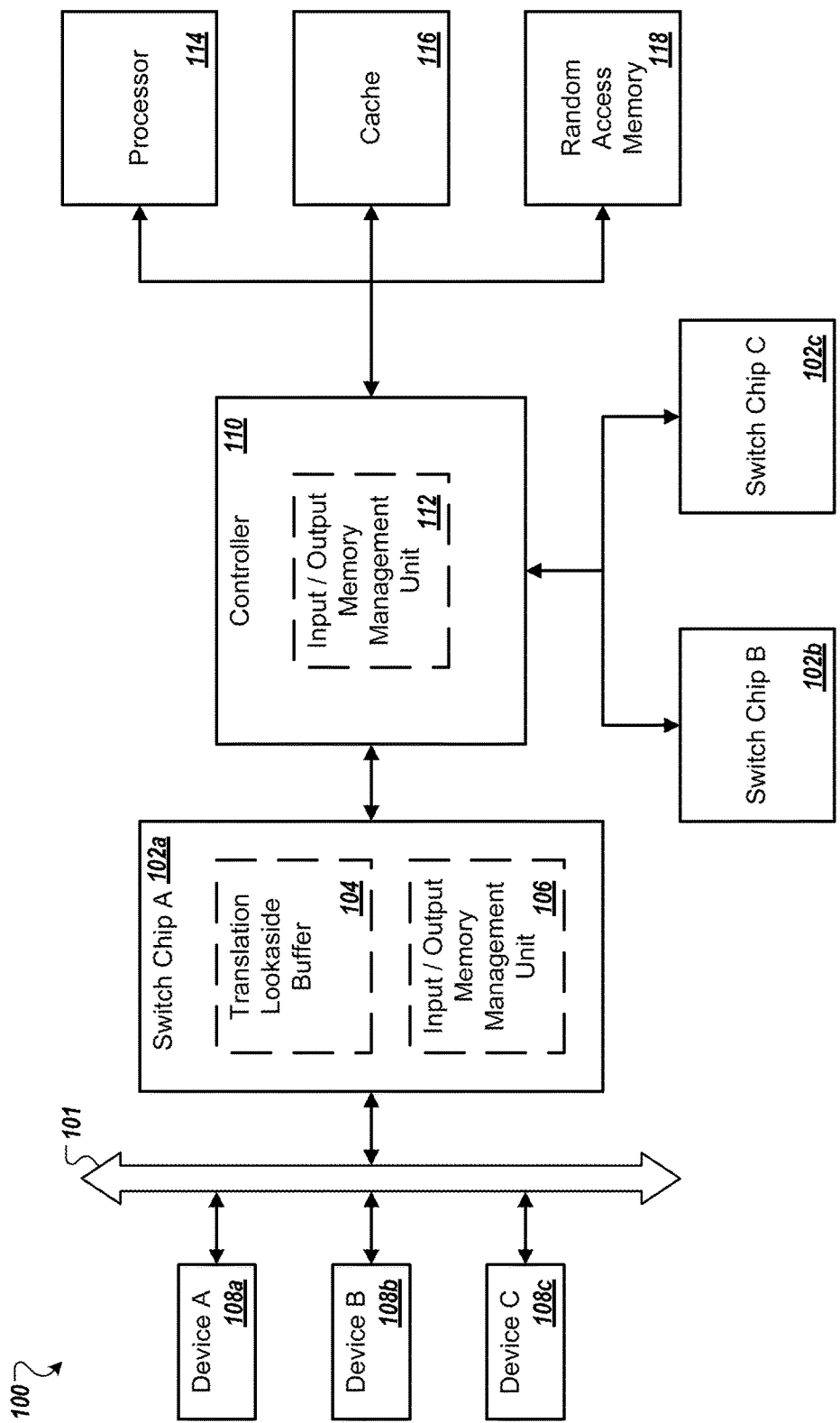
FIG. 1 is an example of an environment in which a switch chip stores a mapping of virtual addresses to physical addresses.

In some implementations, a switch chip, e.g., a Peripheral Component Interconnect Express (PCIe) switch chip, caches address translation services (ATS) translations on behalf of devices connected to a bus managed by the switch chip. For instance, when a device emits a Peripheral Component Interconnect (PCI) read or write request onto the bus, the switch chip checks a translation lookaside buffer (TLB) included in the switch chip for a virtual address included in the request and, on a hit, translates the virtual address to determine a physical address. The switch chip may provide the physical address to the device or include the physical address in the request and forward the request to another device, e.g., for servicing.

On a TLB miss, the switch chip emits an ATS request, e.g., to an input/output memory management units (IOMMU) in a root complex, connected to the switch chip by another bus, for a translation of the virtual address, receives the translation, and caches the translation in the switch chip's TLB. In some implementations, for parallelism, the switch chip can send the untranslated original request to the root complex concurrently while checking the TLB for the virtual address.

The switch chip may intercept PCIe configuration space accesses to devices connected to a bus managed, at least in part, by the switch chip to force an ATS capability bit to one, e.g., enable the ATS capability bit. This may cause an operating system, which runs on the hardware that includes the switch chip and the device, or a device driver in the operating system, to enable ATS for the device. When ATS is enabled for the device, the IOMMU provides the switch chip, and the device if the device supports ATS, with virtual address to physical address mappings in response to address translation requests, read or write access requests, or both.

In some examples, when a device driver in an operating system enables ATS for a device, the device driver allows the operating system to whitelist known trusted switch chips. For instance, the device driver may allow the operating system to execute on hardware that includes switch chips that include a memory, e.g., a TLB, and store virtual address to physical address mappings and switch chips that do not include a memory to store virtual address to physical address mappings. The device driver would whitelist the switch chips that include a memory to indicate that those switch chips may receive mappings, that requests from those switch chips do not need to be validated, or both.

For example, a switch chip may use the mappings stored in its memory to validate read requests, write requests, or both, received from devices connected to the bus managed, at least in part, by the switch chip. When another hardware device, e.g., an IOMMU or a processor, receives a request from that switch chip, the other hardware device may use the whitelist to determine whether or not the request should be validated and whether the device that created the request should be allowed access to a corresponding memory location or not. When the other hardware device receives a request from a switch chip that is not on the whitelist, the other hardware device may validate the request to ensure that the device that created the request is not allowed access to a memory location to which the device does not have access, e.g., when the device that created the request is malicious, includes erroneous software, or both.

In some implementations, a switch chip, e.g., a PCIe switch chip, includes an IOMMU and, optionally, a page table storage. For instance, the switch chip includes a page table walker and an onboard memory in which to store page tables. The switch chip may receive address translation requests from devices connected to a bus managed, at least in part, by the switch chip and determine whether a corresponding physical address is stored in the page tables. If so, the switch chip provides the requesting device with a corresponding physical address. If not, the switch chip may forward the request to another device, e.g., a cache or a root complex IOMMU, and store a response received from the other device in the switch chip's memory, e.g., the page table storage. The switch chip may then respond to the original request.

Example System

FIG. 1 is an example of an environment 100 in which a switch chip A 102a stores a mapping of virtual addresses to physical addresses. In some implementations, the switch chip A 102a includes a TLB 104 in which the switch chip A 102a stores the mapping.

For instance, when one of devices A-C 108a-c is added to the environment 100 and connects to the switch chip A 102a through the bus 101, the switch chip A 102a assigns a port address to the device, e.g., the device A 108a. When the device A 108a requests a translation of a virtual address to a physical address, the switch chip A 102a determines whether the TLB 104 includes a translation for the requested virtual address. The switch chip A 102a may initially determine that the TLB 104 does not include any address translations and request a translation from a controller 110, e.g., an IOMMU 112 included in the controller 110, or another device, such as a processor 114 or a cache 116.

In some implementations, when the environment 100 includes a PCIe bus, e.g., the bus 101 is a PCIe bus, the controller 110 may be a root complex. For instance, the root complex may be a switch that routes data between and managed requests for the different switch chips A-C 102a-c.

The switch chip A 102a receives a response to the request for the translation, determines a physical address for the requested virtual address, and provides the physical address to the device A 108a. In some examples, the response may include a single virtual address to physical address mapping. In some examples, the response may include mappings for multiple different virtual addresses, assigned to the device A 108a, each to a corresponding physical address, to which the device A 108a has access.

The switch chip A 102a may request mappings for the device A 108a when the device A 108a connects to the bus 101 managed by the switch chip A 102a. For instance, the switch chip A 102a may request a predetermined quantity of address translations from another device, e.g., the controller 110, when the device A 108a connects to the bus 101 managed by the switch chip A 102a. The address translations may be for the low-numbered virtual addresses, the high-numbered virtual addresses, the virtual addresses most likely to be accessed by the device A 108a, or a combination of two or more of these.

Once the switch chip A 102a has virtual address to physical address mappings stored in the TLB 104, the switch chip A 102a may respond to address translation requests from the device A 108a without requesting a translation from another device. For example, the switch chip A 102a may determine that, for a particular virtual address, the TLB 104 includes a mapping of the particular virtual address to a particular physical address and provide the particular physical address to the device A 108a.

The switch chip A 102a may use the port number, the bus-device-function number, or both, for the device A 108a to determine the mapping for the device A 108a. For instance, the TLB 104 may include mappings for both the device A 108a and the device B 108b and the switch chip A 102a may use the port number and bus-device-function number for the device A 108a to look at only the mappings for the particular function of the device A 108a and not the device B 108b.

In some examples, when the switch chip A 102a receives a request for an address translation from the device A 108a, the switch chip A 102a may forward the request to another device for servicing, e.g., the controller 110 and, concurrently, determine whether the TLB 104 includes a response for the request. Here the switch chip A 102a does not wait to determine that the TLB 104 does not include a corresponding physical address before forwarding the request to another device for servicing.

The switch chip A 102a may evict entries from the TLB 104 using any appropriate eviction policy, e.g., when the switch chip A 102a cannot store an additional mapping in the TLB 104. For instance, the switch chip A 102a may evict the least recently used entry or the most recently used entry.

In implementations when a device stores mappings in its own memory and the switch chip A 102a evicts an entry from the TLB 104, the switch chip A 102a may send a message to the corresponding device, e.g., the device A 108a, instructing the device to evict the same entry from the device's memory. For instance, when the switch chip A 102a receives an address translation request from the device A 108a for which the TLB 104 does not include a mapping, the switch chip A 102a may request a translation from the controller 110. The switch chip A 102a determines that the TLB 104 does not include any unused memory locations and that a least recently used entry should be evicted from the TLB 104. The switch chip A 102a stores the translation received from the controller 110 in the newly emptied memory location and sends a message to the device A 108a instructing the device A 108a to evict the same least recently used entry from the device A's memory. The switch chip A 102a may receive a confirmation that the device A 108a evicted the entry. The switch chip A 102a sends the device A 108a the translation received from the controller 110, e.g., in response to receipt of the confirmation that the device A 108a evicted the least recently used entry.

The environment 100 may use address translation services (ATS) to indicate whether the switch chips A-C 102a-c and the devices A-C 108a-c may store address translation mappings in memory. For instance, the environment 100 may use an ATS bit to indicate whether the device A 108a can use ATS and is allowed to use ATS. When the device A 108a connects to the bus 101 managed by the switch chip A 102a, the switch chip A 102a may intercept configuration settings for the device A 108a, e.g., PCIe configuration space settings, to "enable" ATS for the device A 108a, e.g., set the bit to a value of "one".

In examples in which the device A 108a does not support ATS, the switch chip A 102a receives access requests from the device A 108a and may forward the requests to the controller 110 for translation or may translate the virtual address or virtual addresses in the access request itself. For instance, the switch chip A 102a may enable ATS for the device A 108a, receive an access request from the device A 108a, determine the virtual addresses in the request, send a message to the controller 110 for a mapping of the virtual addresses in the request to corresponding physical addresses, receive the mapping, and use the received mapping to translate the virtual addresses received from the device A 108a to the corresponding physical addresses.

In some implementations, when the device A 108a does not support ATS, the switch chip A 102a does not enable the ATS bit to indicate that the device A 108a supports ATS. For instance, when the switch chip A 102a will not translate any virtual addresses in requests received from the device A 108a to corresponding physical addresses, the switch chip A 102a does not enable the ATS bit.

In examples in which the device A 108a supports ATS, the environment 100 may or may not allow the device A 108a to use ATS functionality. For instance, when the environment 100 allows the device A 108a to use ATS functionality, the switch chip A 102a may check the settings for the device A 108a to ensure that the ATS bit is enabled, e.g., set to one, and, in response to determining that the ATS bit is enabled, not modify the ATS bit. The switch chip A 102a may receive address translation requests from the device A 108a and respond to the address translation requests as described above.

The switch chip A 102a may validate requests from the device A 108a that include physical addresses, e.g., translated addresses. For instance, when the switch chip A 102a receives a memory access request from the device A 108a, the switch chip A 102a determines that the request is a memory access request, e.g., and not a translation request. The switch chip A 102a determines the physical address or addresses included in the request and whether those addresses are included in the TLB 104. If those addresses are included in the TLB 104, the switch chip A 102a forwards the request to another device for servicing, e.g., the processor 114, the cache 116, or a random access memory 118.

If the switch chip A 102a determines that one or more of the physical addresses included in an access request from the device A 108a are not included in the TLB 104, the switch chip A 102a does not forward the access request to another device. For instance, the switch chip A 102a determines that the device A 108a does not have access to the physical addresses that are not included in the TLB 104 and that the access request should not be serviced.

When the switch chip A 102a determines that a memory access request should be serviced, the switch chip A 102a may forward the request via the root complex. In these examples, the controller 110 may determine that the switch chip A 102a validated the request, e.g., by using an identifier for the switch chip A 102a to determine that the switch chip A 102a validates all memory access requests received by the switch chip A 102a. The controller 110 may forward the request to another device, such as a destination device that will service the request, e.g., that includes the memory location identified by the physical address in the request.

In examples in which the device A 108a supports ATS but the environment 100 does not allow the device A 108a to use ATS functionality, the switch chip A 102a processes requests from the device A 108a in a manner similar to that when the device A 108a does not support ATS functionality. For example, the switch chip 102a may translate virtual addresses included in memory access requests from the device A 108a. In some examples, the switch chip 102a may check requests from the device A 108a to determine that the requests do not include a physical address, e.g., using any appropriate method.

In some implementations, the switch chip A 102a includes an IOMMU 106 in which the switch chip A 102a stores memory addresses. For instance, the switch chip A 102a includes the IOMMU 106 and does not include the TLB 104. The IOMMU 106 includes a memory in which the IOMMU can store page tables, e.g., a page table storage.

When the device B 108b connects to the bus 101 managed by the switch chip A 102a, e.g., when the device B 108b is connected to a motherboard using a physical connection that includes the bus 101 and the switch chip A 102a on a path between the device B 108b and the processor 114, the switch chip A 102a may request one or more page tables for the device B 108b. In some examples, the switch chip A 102a requests page tables for the device B 108b in response to receiving an address translation request from the device B 108b, a memory access request from the device B 108b, or both.

The switch chip A 102a responds to address translation requests for the device B 108b using page tables stored in the IOMMU 106 and which are specific to the device B 108b, e.g., and not another device to which the switch chip A 102a is connected via the bus 101. For example, the switch chip A 102a receives an address translation request from the device B 108b that includes a virtual address. The switch chip A 102a determines whether the IOMMU 106 includes a mapping of the virtual address to a corresponding physical address, e.g., using a page table walker that accesses the page table storage in the IOMMU 106. When the IOMMU 106 includes the mapping, the switch chip A 102a determines the corresponding physical address and provides the physical address to the device B 108b. When the IOMMU 106 does not include the mapping, the switch chip A 102a requests additional page tables from another device, e.g., the cache 116, the random access memory 118, or the IOMMU 112 in the controller 110.

The IOMMU 106 may use an eviction policy for the page tables stored in the IOMMU's memory. For instance, when the IOMMU 106 does not include space for another page table, the IOMMU 106 may evict the least recently used or the most recently used page table, e.g., for any device connected to the bus 101 managed by the switch chip A 102a or for the particular device for which the switch chip A 102a will store a new page table in the IOMMU 106.

When the switch chip A 102a receives a memory access request from the device B 108b, the switch chip A 102a may determine whether the memory access request includes a virtual address or a physical address. When the memory access request includes a virtual address, the switch chip A 102a determines a corresponding physical address using the page tables in the IOMMU 106 and replaces the instances of the virtual address, in the memory access request, with the corresponding physical address. The switch chip A 102a may then forward the memory access request to another device for servicing, e.g., the processor 114, the cache 116, or the random access memory 118.

When the switch chip A 102a receives a memory access request that includes a physical address from the device B 108b the switch chip A 102a validates the physical address.

For instance, the switch chip A 102a determines the page tables in the IOMMU 106 for the device B 108b and determines whether the physical address is included in the determined page tables. The switch chip A 102a may use a port number or bus-device-function number for the device B 108b to determine the page tables in the IOMMU 106 for the device B 108b. The switch chip A 102a uses the page tables for the device B 108b to ensure that the device B 108b does not gain access to a physical memory location to which the device A 108a, or another device, has access but the device B 108b does not have access.

In some implementations, for each predetermined page range, e.g., 4K page range, the environment 100, e.g., the switch chip A 102a, has a bit that indicates whether the page range is mapped to a device, e.g., an "is this mapped" bit, or two bits that indicate read and write permissions. The environment 100 may include a bit identifier, e.g., a single bit or two bits, for each device bus-device-function number, e.g., for each bus-device-function combination.

When the physical address is included in the page tables for the device B 108b, the switch chip A 102a forwards the memory access request to another device for servicing, e.g., the processor 114, the cache 116, or the random access memory 118. When the physical address is not included in the page tables for the device B 108b, the switch chip A 102a does not service the request. In some examples, the switch chip A 102a may reset the device B 108b, halt the device B 108b, or both, when the physical address is not included in the page tables for the device B 108b.

In some implementations, the environment 100 may include a motherboard, a computer, or multiple computers, e.g., that include a) one or more of the switch chips A-C 102a-c, b) the controller 110, c) the processor 114, d) the cache 116, the random access memory 118, or two or more of these. The environment 100 includes an operating system executing on the hardware, e.g., executing on the motherboard, the computer, or both.

Enabling an ATS bit for the device A 108a, e.g., setting the value of the ATS bit to one, may instruct an operating system, running on the hardware that includes the switch chip A 102a, to enable ATS for the device A 108a to allow the device A 108a and the switch chip A 102a to cache virtual address to physical address mappings, e.g., in the TLB 104. The switch chip A 102a may enable the ATS bit for the device A 108a in response to the device A 108a connecting to the bus 101 managed by the switch chip A 102a.

In some examples, a device driver included in the software may enable the ATS bit, e.g., in response to a message from the switch chip A 102a when the device A 108a connects to the bus 101 managed by the switch chip A 108a. In these examples, the device driver may allow the operating system to whitelist known switch chips, that can cache address mappings, to allow those switch chips to cache address mappings in a memory of the switch chip, e.g., in the TLB 104.

The environment 100 or the operating system may use the whitelist to determine the functionality of the corresponding switch chip and whether or not the switch chip should be allowed to perform particular actions, e.g., caching of address mappings in an integrated memory, validation of addresses, or both. For instance, the environment 100 may include switch chips of different types and may determine what actions each of these switch chips is allowed to perform using the whitelist.

In some examples, the switch chip A 102a may include a TLB, the switch chip B 102b may include an IOMMU, and the switch chip C 102c may not include either a TLB or an IOMMU. The environment 100 may connect devices that use ATS to the bus 101 managed by the switch chip A 102a, devices that use another method to cache physical memory addresses locally on the device to a second bus managed by the switch chip B 102b, and devices that do not cache physical memory addresses locally on the device to a third bus managed by the switch chip C 102c. The environment 100 may allow any appropriate type of device to connect to any appropriate type of switch chip via the corresponding bus.

Example Address Translation Process Flow

Figure 2:
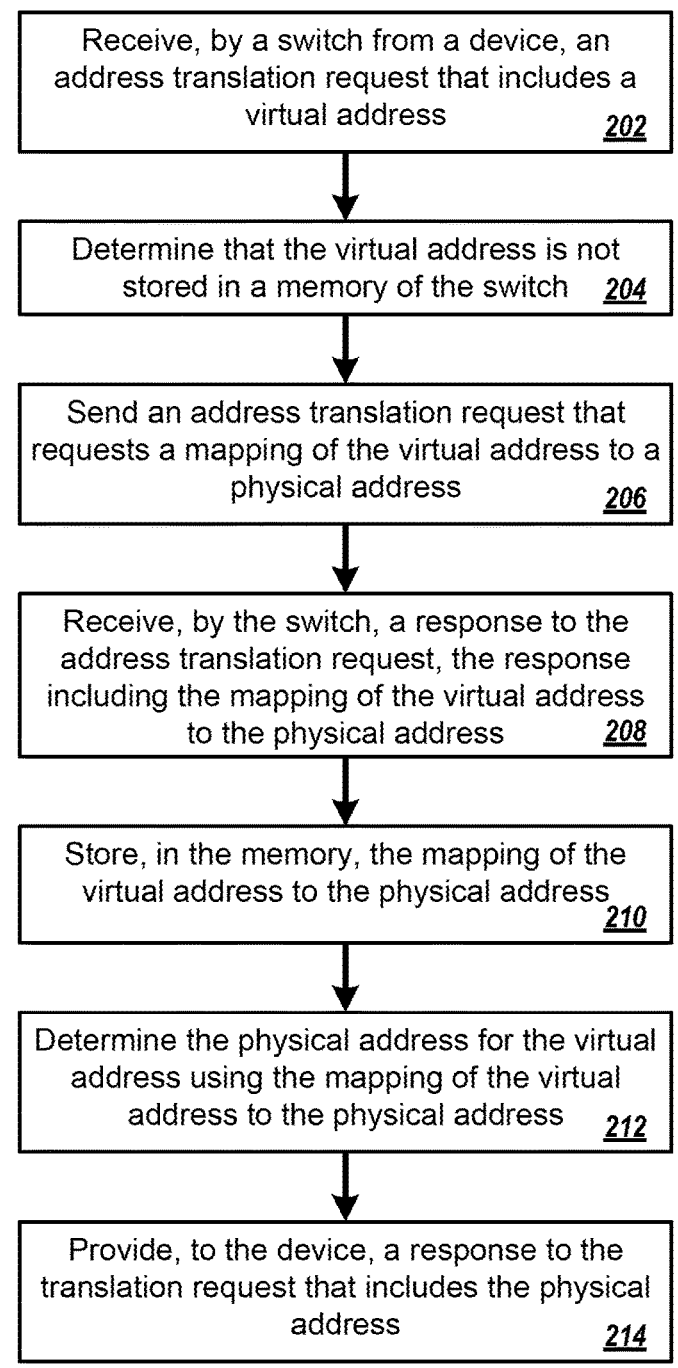
FIG. 2 is a flow diagram of a process for responding to a translation request.

FIG. 2 is a flow diagram of a process 200 for responding to a translation request. For example, the process 200 can be used by the switch chip A 102a from the environment 100.

A switch receives, from a device, an address translation request that includes a virtual address (202). For instance, the switch receives the address translation request from an ATS enabled device.

The switch determines that the virtual address is not stored in a memory of the switch (204). For example, the switch checks a TLB or an IOMMU, included in the switch, to determine whether the TLB or the IOMMU includes the virtual address, and a mapping of the virtual address to a corresponding physical address. The switch determines that the TLB or the IOMMU does not include the virtual address, and the corresponding physical address.

The switch sends an address translation request that requests a mapping of the virtual address to a physical address (206). In some examples, in response to determining that the virtual address is not stored in the memory, the switch sends the address translation request to another device. For instance, the switch sends the address translation request to a root complex, e.g., when the memory is a TLB, or to a cache or random access memory, e.g., when the memory is an IOMMU.

The switch receives a response to the address translation request, the response including the mapping of the virtual address to the physical address (208). The switch stores, in the memory, the mapping of the virtual address to the physical address (210). For example, in response to sending the address translation request, the switch receives the response to the address translation request, e.g., from the root complex, and stores the response, or data from the response, in the memory. The switch may use data from the response to create an entry in the TLB. In some examples, the switch may receive part of or all of a page table and store the part of the page table in the IOMMU.

The switch determines the physical address for the virtual address using the mapping of the virtual address to the physical address (212). For instance, the switch uses the response or data stored in the memory to determine the physical address to which the virtual address is mapped.

The switch provides, to the device, a response to the translation request that includes the physical address (214). For example, the switch may forward the response received from the root complex to the device. In some examples, the switch creates a new response that includes the physical address and provides the new response to the device.

The order of steps in the process 200 described above is illustrative only, and responding to the translation request can be performed in different orders. For example, the switch may send the address translation request, e.g., perform step 206, prior to determining that the virtual address is not stored in the memory, e.g., perform step 204. In some examples, the switch may perform steps 204 and 206 concurrently.

In some implementations, the process 200 can include additional steps, fewer steps, or some of the steps can be divided into multiple steps. For example, the switch may receive an address translation request, determine that the virtual address is stored in the memory, and determine the physical address using the mapping of the virtual address to the physical address, e.g., without performing steps 204 through 210.

In some implementations, the switch may perform the process 200, or part of the process 200, for multiple different address translation requests. For instance, the switch may receive a first address translation request from a first device, determine that a first physical address responsive to the first request is stored in the memory, and provide the first physical address to the first device. The switch may receive a second address translation request, from the first device or a second, different device, determine that a second physical address responsive to the second request is not stored in the memory, e.g., that the virtual address from the second request is not stored in the memory, and request a mapping for the virtual address from another device, e.g., a root complex or a cache. The switch receives a response to the request from the other device that includes the mapping and provides the second physical address to the requesting device.

The switch may include a separate memory for each of the devices for which the switch stores virtual address to physical address mappings. In some examples, the switch may include both a TLB and an IOMMU.

Example Validation Process Flow

Figure 3:
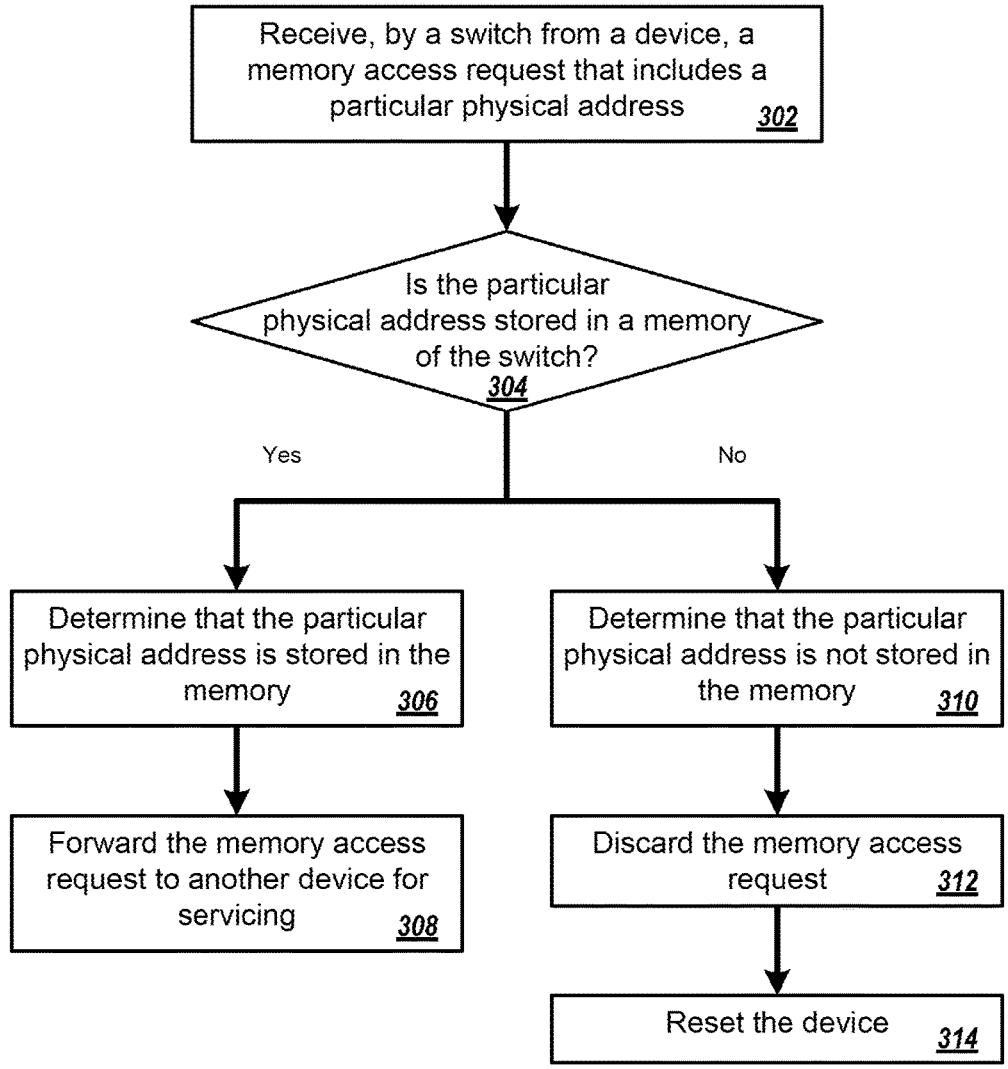
FIG. 3 is a flow diagram of a process for determining whether a physical address is stored in a memory.

FIG. 3 is a flow diagram of a process 300 for determining whether a physical address is stored in a memory. For example, the process 300 can be used by the switch chip A 102a or the controller 110 from the environment 100.

A switch receives, from a device, a memory access request that includes a particular physical address (302). For instance, the switch receives a read or a write request.

The switch determines whether the particular physical address is stored in a memory of the switch (304). The memory may be a TLB or an IOMMU. The switch validates the request by determining whether the particular physical address is stored in the memory and the device is allowed access to the particular physical address. The memory may be specific to the device, e.g., when the switch has one memory for each device for which the switch stores virtual address to physical address mappings. The memory may be for all devices to which the switch connects via a corresponding bus.

The switch determines that the particular physical address is stored in the memory (306). If the switch determines that the particular physical address is stored in a memory for the device, when there is a single memory for each device, the switch validates the request. If the switch determines that the particular physical address is stored in a single memory for all devices and that the device is allowed access to the particular physical address, the switch validates the request.

In response to determining that the particular physical address is stored in a memory of the switch, the switch forwards the memory access request to another device for servicing (308). For instance, the switch forwards the request to a destination device which has data responsive to the request. The forwarding of the request may route the request through one or more intermediate devices. In some examples, when a cache contains data responsive to the request, the switch may forward the request to the cache via a root complex.

The switch determines that the particular physical address is not stored in the memory (310). For example, the switch determines that the device is not allowed to access a memory location identified by the particular physical address. When the particular physical address is stored in another memory of the switch that is not for the device, when each device has its own memory, or is stored in a single memory for all devices but the particular physical address is not associated with the device, e.g., the device should not be allowed access to the particular physical address, the switch does not validate the request.

In response to determining that the particular physical address is not stored in a memory of the switch, the switch discards the memory access request (312). For instance, the switch does not forward the request to another device for servicing or respond to the request or does not do either. In some examples, the switch may log an error identifying details of discarded memory access request, e.g., the particular physical address that is not stored in the memory of the switch and an identifier for the source device that sent the request to the switch.

In response to determining that the particular physical address is not stored in a memory of the switch, the switch resets the device (314). For example, the switch may determine that the device is malicious, has a software bug, or both, and reset the device, e.g., to prevent the device from accessing a memory location to which the device does not have access.

The order of steps in the process 300 described above is illustrative only, and determining whether the physical address is stored in the memory can be performed in different orders. For example, the switch may reset the device and then discard the memory access request, e.g., perform step 314 and then step 312.

In some implementations, the process 300 can include additional steps, fewer steps, or some of the steps can be divided into multiple steps. For example, the switch may perform part or all of the process 300 for multiple different memory access requests, multiple different types of memory access requests, e.g., read, write, or both, multiple different devices connected to a bus managed by the switch, or a combination of two or more of these. The switch may validate some of the requests, invalidate some of the requests, or both validate some requests and invalidate some requests.

In some implementations, another device with a TLB or an IOMMU validates requests. For instance, a root complex may perform the process 300 to validate a request.

Optional Implementation Details

In some implementations, a switch chip may include a TLB for each device for which the switch chip stores address mappings, e.g., for each port that allows a device to connect to a bus managed by the switch chip and for which the switch chip stores address mappings. The switch chip may use port information to determine which TLB should be accessed, e.g., to determine an address mapping for a particular device or to validate a memory access request for a particular device. The switch chip may use any appropriate method to determine which TLB to access for a particular device.

In some implementations, a switch chip may use an identifier, e.g., a port identifier, to identify a device and determine whether the device can or cannot cache address mappings locally on the device. For instance, a switch chip may include a bit for each port that indicates whether a device connected to that port, via a bus, supports ATS and the switch chip should respond to address translation requests from that device.

A size of a memory, e.g., the IOMMU, in a switch chip may be selected based on a number of devices for which the memory stores address mappings, e.g., a number of ports in the switch chip when each port corresponds to a device which may connect to a bus managed by the switch chip and for which the IOMMU stores page tables. For instance, a switch chip with the functionality to connect to, via a bus, and stores page tables for at most sixteen devices may include a larger IOMMU than another switch chip with functionality to connect to, via another bus, and stores page tables for at most four devices.

In some implementations, the IOMMU may store a percentage of a total number of page tables for one or more devices. For instance, when a particular device may access a large number of memory locations, the IOMMU may store some, but not all, of the pages tables for the particular device.

A switch chip may allocate a predetermined percentage of an IOMMU to storage of page tables for each device for which the IOMMU stores page tables. For instance, when a switch chip may connect to, via a bus, and store page tables for at most sixteen devices, and one device is connected to the bus managed by the switch chip, the switch chip may allocate the entire IOMMU to store page tables for the one device. When another device connects to the bus managed by the switch chip, the switch chip may allocate half of the memory in the IOMMU to each of the devices, and so on for additional devices. In some implementations, the IOMMU may allocate one sixteenth of the memory to each device irrespective of how many devices are actually connected to the bus managed by the switch chip.

In some implementations, a switch chip may include a memory management unit (MMU) instead of an IOMMU. For instance, the switch chip may use the MMU to translate virtual addresses to physical addresses for the devices connected to a bus managed by the switch chip.

Additional Implementation Details

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
a switch that receives packets from and delivers packets to one or more devices connected to a bus without any components on the bus between the switch and each of the devices;
a memory integrated into the switch to store a mapping of virtual addresses to physical addresses; and
a non-transitory computer readable storage medium integrated into the switch storing instructions executable by the switch and upon such execution cause the switch to perform operations comprising:
receiving, by the switch, a response to an address translation request for a device connected to the switch by the bus, the response including a mapping of a virtual address to a physical address;
storing, in the memory, the mapping of the virtual address to the physical address in response to receiving the response to the address translation request for the device;
receiving, from the device, a memory access request that includes a particular physical address;
determining that the particular physical address is stored in the memory; and
forwarding the memory access request to another device for servicing in response to determining that the particular physical address is stored in the memory.

2. The system of claim 1, comprising:
an input/output memory management unit (IOMMU) integrated into the switch and including an IOMMU memory, wherein:
the memory comprises the IOMMU memory;
receiving, by the switch, the response to the address translation request for the device comprises receiving, by the switch, a portion of a page table for the device; and
storing, in the memory, the mapping of the virtual address to the physical address comprises storing the portion of the page table in the IOMMU.

3. The system of claim 1, wherein:
the memory comprises a translation lookaside buffer (TLB); and
storing, in the memory, the mapping of the virtual address to the physical address comprises storing, in the TLB, the mapping of the virtual address to the physical address.

4. The system of claim 3, comprising:
a predetermined number of ports for the switch, each of the ports corresponding to a particular device and for which the switch includes a single TLB.

5. The system of claim 3, the operations comprising:
determining that the TLB does not include an empty location in response to receiving the response to the address translation request for the device;
removing an entry from a location in the TLB; and
storing a new entry in the location in the TLB that maps the virtual address to the physical address.

6. The system of claim 3, the operations comprising:
determining that a setting that is specific to the device indicates that the device is currently storing virtual address to physical address mappings in a TLB on the device;
sending a message to the device instructing the device to remove an entry from the device's TLB in response to determining that the setting that is specific to the device indicates that the device is currently storing virtual address to physical address mappings in the TLB on the device; and
providing the mapping of the virtual address to the physical address to the device in response to determining that the setting that is specific to the device indicates that the device is currently storing virtual address to physical address mappings in the TLB on the device.

7. The system of claim 6, the operations comprising:
receiving, from the device, a confirmation that the device has removed the entry from the device's TLB, wherein providing the mapping of the virtual address to the physical address to the device comprises providing the mapping of the virtual address to the physical address to the device in response to receiving the confirmation that the device has removed the entry from the device's TLB.

8. The system of claim 1, wherein:
the switch receives packets from and delivers packets to two or more devices, including the device, that are each connected to a bus without any components on the bus between the switch and the respective device;
the memory is specific to the device and does not include any virtual address to physical address mappings for other devices connected to the switch by the bus and included in the two or more devices; and
the system comprises:
one or more additional memories each of which a) is specific to a particular device in the two or more devices other than the device and b) does not include any virtual address to physical address mappings for other devices connected to the switch by the bus and included in the two or more devices.

9. The system of claim 1, comprising:
one or more additional memories integrated into the switch, each of the additional memories and the memory specific to a particular device connected to the switch by the bus, wherein determining that the particular physical address is stored in the memory comprises:
determining that a particular port in the switch received the memory access request;
selecting, from a group comprising the memory and the additional memories, the memory for the device using the particular port; and
determining that the particular physical address is stored in the memory in response to selecting the memory for the device using the particular port.

10. The system of claim 1, comprising:
a central processing unit; and
a cache, wherein:
receiving the response to the address translation request for the device comprises receiving the mapping of the virtual address to the physical address from the cache; and forwarding the memory access request to another device for servicing comprises forwarding the memory access request to the central processing unit.

11. The system of claim 10, comprising:
a controller on a second bus that connects the switch to the central processing unit and the cache, via the second bus, and routes responses and requests to and from the switch and the central processing unit and the cache using the second bus.

12. The system of claim 11, wherein the controller comprises a root complex.

13. The system of claim 10, comprising:
a plurality of switches including the switch; and
a controller on a second bus that connects each of the plurality of switches to the central processing unit and the cache, via the second bus, and routes responses and requests to and from each of the plurality of switches and the central processing unit and the cache using the second bus.

14. The system of claim 1, comprising:
a motherboard; and
the bus, integrated into the motherboard, for which the switch is configured to route requests from a source device to a destination device to allow peripheral devices to connect to the motherboard.

15. The system of claim 1, comprising:
a predetermined number of ports integrated into the switch, each of the ports corresponding to a particular device for which the memory is configured to store a corresponding mapping of virtual addresses to physical addresses, wherein a size of the memory corresponds to the predetermined number of ports.

16. A system comprising:
a switch that receives packets from and delivers packets to one or more devices connected to a bus without any components on the bus between the switch and each of the devices;
a memory integrated into the switch to store a mapping of virtual addresses to physical addresses; and
a non-transitory computer readable storage medium integrated into the switch storing instructions executable by the switch and upon such execution cause the switch to perform operations comprising:
receiving, by the switch, a response to an address translation request for a device connected to the switch by the bus, the response including a mapping of a virtual address to a physical address;
storing, in the memory, the mapping of the virtual address to the physical address in response to receiving the response to the address translation request for the device
receiving, from the device, a memory access request that includes a particular physical address;
determining that the device is not allowed to access a memory location identified by the particular physical address using data from the memory including the mapping of the virtual address to the physical address;
discarding the memory access request in response to determining that the device is not allowed to access a memory location identified by the particular physical address; and
resetting the device in response to determining that the device is not allowed to access a memory location identified by the particular physical address.

17. The system of claim 1, the operations comprising:
receiving, by the switch from the device, the address translation request that includes the virtual address;
determining that the virtual address is not stored in the memory; and
requesting the mapping of the virtual address to the physical address, wherein receiving, by the switch, the response to the address translation request for the device comprises receiving the response in response to requesting the mapping of the virtual address to the physical address.

18. The system of claim 17, the operations comprising:
determining a corresponding physical address for the virtual address using the mapping of the virtual address to the physical address; and
providing, to the device, a second response to the address translation request that includes the corresponding physical address.

19. The system of claim 17, the operations comprising:
determining whether the memory includes the mapping of the virtual address to the physical address concurrently with requesting the mapping of the virtual address to the physical address.

20. The system of claim 17, wherein requesting the mapping of the virtual address to the physical address comprises requesting, from a central processing unit, the mapping of the virtual address to the physical address.

21. The system of claim 17, wherein requesting the mapping of the virtual address to the physical address comprises requesting, from a memory, the mapping of the virtual address to the physical address.

22. The system of claim 17, wherein requesting the mapping of the virtual address to the physical address comprises requesting, from an input/output memory management unit (IOMMU), the mapping of the virtual address to the physical address.

23. The system of claim 16, wherein determining that the device is not allowed to access a memory location identified by the particular physical address comprises determining that the particular physical address is not stored in the memory.

24. A computer-implemented method comprising:
receiving, by a switch that receives packets from and delivers packets to one or more devices connected to a bus without any components on the bus between the switch and each of the devices, a response to an address translation request for a device connected to the switch by the bus, the response including a mapping of a virtual address to a particular physical address;
storing, in a memory integrated into the switch to store a mapping of virtual addresses to physical addresses, the mapping of the virtual address to the physical address in response to receiving the response to the address translation request for the device;
determining that a setting on the switch that is specific to the device indicates that the device is currently storing virtual address to physical address mappings in a translation lookaside buffer (TLB) on the device;
sending a message to the device instructing the device to remove an entry from the device's TLB in response to determining that the setting on the switch that is specific to the device indicates that the device is currently storing virtual address to physical address mappings in the translation lookaside buffer (TLB) on the device; and
providing the mapping of the virtual address to the physical address to the device in response to determining that the setting on the switch that is specific to the device indicates that the device is currently storing virtual address to physical address mappings in the translation lookaside buffer (TLB) on the device.

* * * * *